United States Patent
Kopp et al.

(10) Patent No.: US 10,218,718 B2
(45) Date of Patent: Feb. 26, 2019

(54) RAPID, TARGETED NETWORK THREAT DETECTION

(71) Applicant: Cisco Technology, Inc., San Jose, CA (US)

(72) Inventors: Martin Kopp, Beroun (CZ); Tomas Pevny, Prague 4-Modrany (CZ)

(73) Assignee: Cisco Technology, Inc., San Jose, CA (US)

( * ) Notice: Subject to any disclaimer, the term of this patent is extended or adjusted under 35 U.S.C. 154(b) by 225 days.

(21) Appl. No.: 15/244,486

(22) Filed: Aug. 23, 2016

(65) Prior Publication Data

US 2018/0063161 A1 Mar. 1, 2018

(51) Int. Cl.
*G06F 21/55* (2013.01)
*H04L 29/06* (2006.01)

(52) U.S. Cl.
CPC .......... *H04L 63/1416* (2013.01); *G06F 21/55* (2013.01); *H04L 63/1441* (2013.01)

(58) Field of Classification Search
None
See application file for complete search history.

(56) References Cited

U.S. PATENT DOCUMENTS

| | | | |
|---|---|---|---|
| 9,288,220 B2 | 3/2016 | Raugas et al. | |
| 9,336,385 B1 * | 5/2016 | Spencer | H04L 63/1441 |
| 9,372,989 B2 | 6/2016 | Grystan et al. | |
| 9,386,028 B2 | 7/2016 | Altman | |
| 2007/0094734 A1 | 4/2007 | Mangione-Smith et al. | |
| 2012/0151586 A1 | 6/2012 | Hentunen | |
| 2016/0381057 A1 * | 12/2016 | Das | H04L 41/0631 726/23 |
| 2017/0054702 A1 * | 2/2017 | Turgeman | H04L 63/08 |
| 2017/0149813 A1 * | 5/2017 | Wright | H04L 63/1425 |
| 2017/0316342 A1 * | 11/2017 | Franc | G06N 99/005 |
| 2018/0115577 A1 * | 4/2018 | Shukla | H04L 63/1425 |

OTHER PUBLICATIONS

L. Breiman et al., "Random Forests", Machine Learning, vol. 45, Issue 1, pp. 5-32, Oct. 2001.
J. Zepeda et al., "Exemplar SVMs as Visual Feature Encoders", The IEEE Conference on Computer Vision and Pattern Recognition (CVPR), 2015, pp. 3052-3060.
T. Pevny et al., "The Challenges of Rich Features in Universal Steganalysis", IS&T/SPIE Electronic Imaging. International Society for Optics and Photonics, 2013.

* cited by examiner

*Primary Examiner* — Christopher A Revak
(74) *Attorney, Agent, or Firm* — Edell, Shapiro & Finnan, LLC

(57) ABSTRACT

Rapidly detecting network threats with targeted detectors includes, at a computing device having connectivity to a network, determining features of background network traffic. Features are also extracted from a particular type of network threat. A characteristic of the particular type of network threat that best differentiates the features of the particular type of network threat from the features of the background network traffic is determined. A targeted detector for the particular type of network threat is created based on the characteristic and an action is applied to particular incoming network traffic identified by the targeted detector as being associated with the particular type of network threat.

20 Claims, 10 Drawing Sheets

RAPID, TARGETED NETWORK THREAT DETECTION

TECHNICAL FIELD

The present disclosure relates to network security.

BACKGROUND

Cybersecurity and, in particular, network security is a rapidly developing field. Generally, cybersecurity techniques attempt to identify malicious activity, such as malware activity, by analyzing as much information as possible in order to identify patterns, signatures, and other such identifiers. In some cases, known malware can be detected by monitoring traffic for these patterns, signatures and/or identifiers; however, in other cases, new malware (e.g., an infection or zero day attack discovered by a security administrator) is discovered by analyzing suspicious traffic. When new malware is discovered, it is beneficial to begin monitoring for the newly discovered malware as soon as possible; however, in some cases, it may take time to upgrade or update security systems to monitor for the newly discovered malware since the security solutions may not currently have the necessary detection capabilities to identify the newly discovered malware.

DESCRIPTION OF EXAMPLE EMBODIMENTS

Overview

Figure 1:
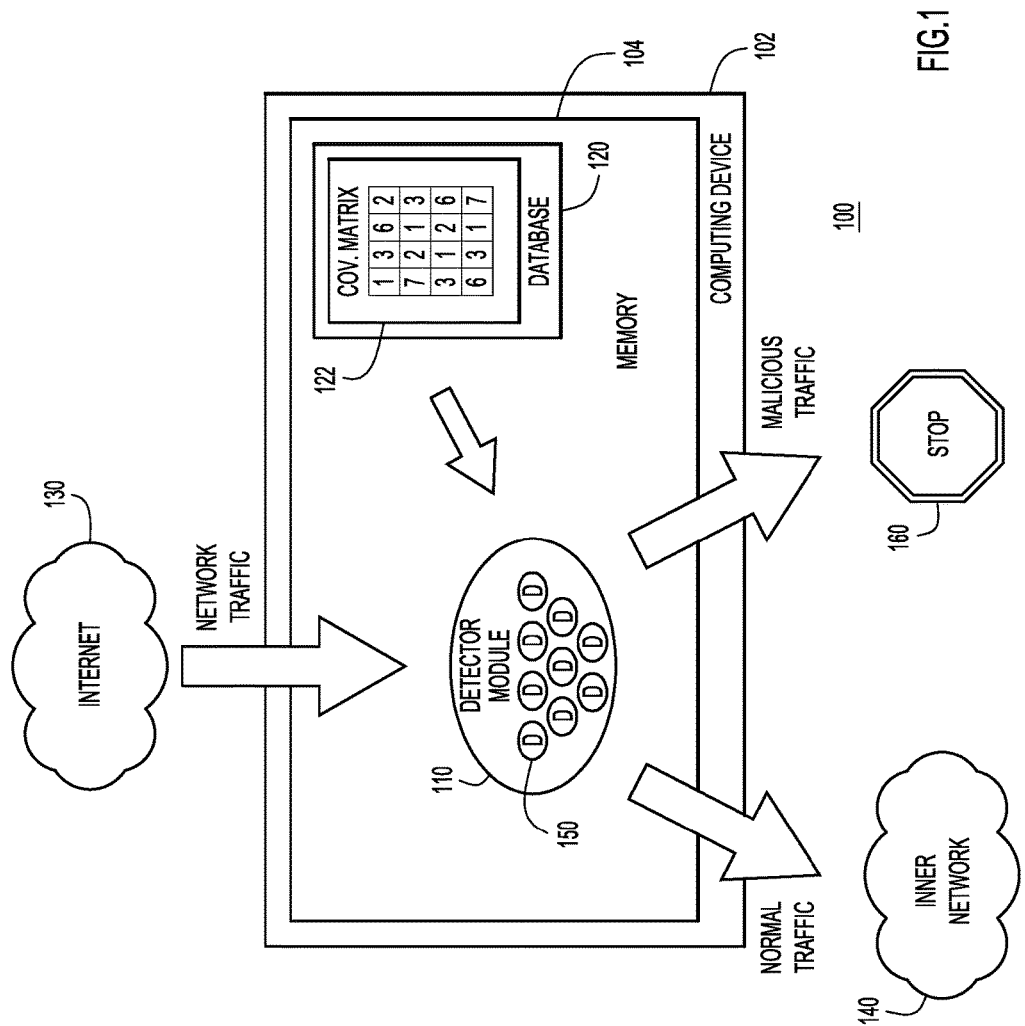
FIG. 1 is a diagram illustrating a networking environment in which the rapid targeted network threat detection methods presented herein may be employed, according to an example embodiment.

Techniques are provided herein for rapid, targeted network threat detection (e.g., for rapidly detecting network threats with targeted detectors). These techniques may be embodied as a method, an apparatus, and instructions in a computer-readable storage media to perform the method.

According to at least one example embodiment, rapidly detecting network threats with targeted detectors includes, at a computing device having connectivity to a network, determining features of background network traffic. Features are also extracted from a particular type of network threat. A characteristic of the particular type of network threat that best differentiates the features of the particular type of network threat from the features of the background network traffic is determined. A targeted detector for the particular type of network threat is created based on the characteristic and an action is applied to particular incoming network traffic identified by the targeted detector as being associated with the particular type of network threat.

EXAMPLE EMBODIMENTS

Presented herein are techniques for identifying specific network threats. The specific network threats are identified with targeted detectors that are generated based on a small sample or a small number of samples of the specific network threat and a more robust sample (e.g., a greater number of samples) of background network traffic (e.g., samples that are unclassified or known to be safe). In at least some embodiments, a single sample of the specific network threat can be used to generate a targeted detector for that specific network threat. Additionally, the techniques presented herein perform only a small number of operations to compare a sampled threat to background traffic and generate a targeted detector. Since these techniques use only a single or small number of samples and perform only a small number of operations to generate a targeted detector, targeted detectors can be rapidly generated and deployed (operations only involving the background traffic can be performed in advance and/or on a rolling basis). Consequently, security systems may be quickly updated and/or supplemented to account for newly discovered malware. These targeted detectors may also be useful to track, identify, and/or safeguard against new malware, as well as mutating or shifting network threats, as each detector may be capable of detecting close variations of the particular threat while ignoring other network traffic.

Without these quickly generated targeted detectors, networks may be exposed to newly discovered malware for significant lengths of time before solutions can be implemented. For example, if a deployed security solution lacks the capabilities to identify newly discovered malware, the deployed security solution must be upgraded, a signature from the new malware must be extracted, and/or further analysis must be performed to allow different instances of the malware to be detected (e.g., for a polymorphic infection). Unfortunately, a deployed security solution usually cannot be upgraded immediately, especially if the solution provider has no knowledge of the respective threat type, and extracting a signature for use in security solution often requires extended analysis (frequently external analysis), which takes time. Moreover, even if signature extraction is possible, the signature may not allow new incoming instances of the threat to be blocked, due to the ever increasing polymorphic nature of modern infections.

The techniques presented herein avoid these pitfalls by comparing a single or small number of samples of a particular (e.g., specific) network threat to pre-computed characteristics of network traffic to find a single distinctive characteristic) and generating a targeted detector for the newly discovered threat based on the characteristic. Consequently, a sophisticated and maintenance-heavy classifier or detector does not need to be trained or upgraded with time-consuming techniques and operations. For example, in at least some embodiments, the techniques provided herein may be implemented as a quick-fix security tool that can be deployed in the time between threat recognition and an update of complex security systems. The "quick-fix" security tool would be practical, allowing administrators to create and deploy a targeted detector for a specific network threat that is capable of detecting the specific threat as well as close variations of the particular threat; however, the tool would not require the administrator to perform specific data analysis or machine learning techniques. Instead, the administrator could simply select a threat for a quick fix and a targeted detector may be automatically created and deployed. In other words, the administrator could simply provide a sample of a new network threat, such as newly discovered malware.

Before turning to the Figures, it is noted that although the term 'characteristic' may appear to describe a single parameter that differentiates the features of background traffic from the features of a particular network threat, in at least some embodiments the characteristic may actually describe multiple features or parameters. For example, when used herein, a characteristic may describe or be based on a linear combination of features of the background traffic and the particular network threat, such as a subset of features or all of the features that differentiate the particular network threat from the background traffic. Consequently, the characteristic may describe complex behavior that is captured by a co-occurrence of events. Moreover, the characteristic may be referred to herein as a direction, since the characteristic may be represented as a direction in Euclidean space.

Reference is now made to FIG. 1 for a description of a network environment 100 in which targeted detectors may be generated and deployed to detect malicious traffic associated with specific network threats, according to an example embodiment. For example, the targeted detectors may be generated and deployed to detect a specific type of malware, insofar as malware, as used herein, refers to executable files that cause a computer/processor to execute instructions. The malware may be in a machine language, interpreted language, intermediate language, script language or any other language now known or hereinafter developed that causes a computer/processor to execute instructions and may infect any number of devices in a network. Networking environment 100 includes a computing device 102, such as a virtual or physical server, a client device, or an intrusion detection/protection system (IDS/IPS), with a memory 104. The computing device 102 and the memory 104 are each described in further detail below in connection with FIG. 11; however, generally, it is noted that the techniques provided herein may be deployed as a plugin to an existing IDS/IPS solution, a stand-alone application, or a stand-alone IDS/IPS. The solutions can also be implemented in cloud environments, such as in the Internet of Things (IoT) context to control devices or classes of devices (e.g., to detect and/or block unwanted devices or communications from a device, such as requests for updated drivers), and/or in an Internet-based application environment, such as a chatroom (e.g., to block recurring trolls who might be evading security measures with multiple identities).

In the particular embodiment depicted in FIG. 1, a detector module 110 and database 120 reside in memory 104 and are configured to receive or access network traffic originating from the Internet 130 and destined to an inner network 140. Based on samples from the network traffic and known network threats, the detector module 110 can generate a number of targeted detectors 150 based on a covariance matrix 122 residing in the database 120 in the manner discussed in further detail below. When the techniques provided herein are implemented as a plugin to an existing IDS/IPS solution, generated targeted detectors may be automatically added to the IDS/IPS framework. Alternatively, the targeted detectors can be deployed as stand-alone detectors. Regardless, these targeted detectors 150 may then review or monitor incoming network traffic from the Internet 130 and determine whether the network traffic is normal/benign or malicious. Normal traffic may be routed to the inner network 140 (like normal), while malicious traffic identified by the targeted detectors 150 may be stopped or blocked, as shown at 160. Additionally or alternatively, the targeted detectors 150 may take other actions, such as updating a black list with Internet Protocol (IP) information of a source of the malicious traffic.

Figure 2:
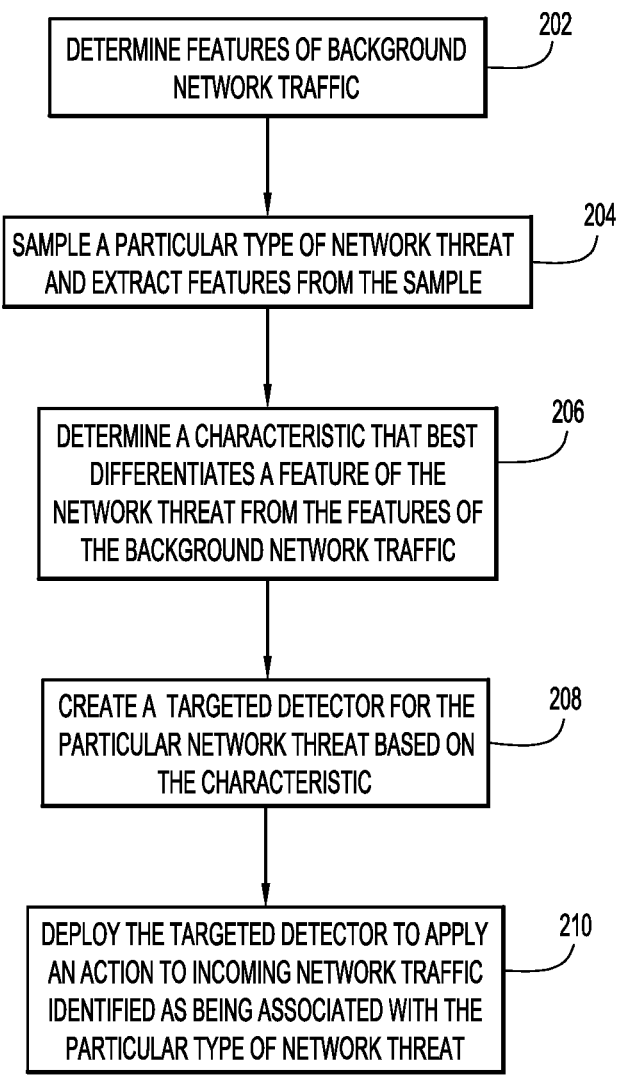
FIG. 2 is a high-level flowchart illustrating a process for rapidly deploying a targeted detector for a particular network threat, according to an example embodiment.

Now referring to FIG. 2, a high-level flowchart is now described of a method 200 for generating or creating targeted detectors that can be deployed to identify a particular network threat, such as malware. Initially, at step 202, the features of background traffic are determined. In at least some embodiments, the background traffic is unlabeled, insofar as unlabeled simply indicates that the traffic is not classified as malicious or benign; however, in other embodiments the background traffic may be traffic that has already been determined to be safe or benign (e.g. traffic that has not been found to be malicious). Since the overwhelming majority of network traffic is typically not malicious, unlabeled and safe traffic should have similar overarching characteristics and features and, thus, either may be utilized to determine features of background traffic at step 202.

In at least some embodiments, the features of the background traffic are determined from samples of background traffic, insofar as samples, when used herein, can be described by some features in d-dimensional Euclidean space. Therefore, when a sample is mentioned herein, it may refer to the representation of the sample in the d-dimensional Euclidean space. For example, in at least one embodiment, each traffic sample may correspond to one Hypertext Transfer Protocol (HTTP) request that is described by a variety of features representing, e.g., Uniform Resource Locator (URL) patterns, transferred bytes, length of connection, period or pattern of connections, and other such features and telemetry input data including HTTP requests can be transformed to 557-dimensional Euclidean space. Regardless, determining and analyzing the features of the background traffic may be computationally expensive (both in terms of time and computing resources) and, thus, the features of the background traffic may be determined and analyzed with a distinct number of operations, as is described in further detail below in connection with FIG. 3. Moreover, the features of the background traffic may only be determined and analyzed once (e.g., statistical measures representing the features may be precomputed prior to other operations or on a rolling basis) so that any number of targeted detectors can be created based on a single set of statistical measures representing the background traffic features. In other words, the features and statistical measures representing the features of the background traffic may be precomputed in a single operation (or set of operations) and may be used to create multiple targeted detectors. Consequently, a massive amount of samples can be considered to accurately determine (e.g., precompute) the features of the background traffic and create statistical measures representing the features without impacting the computational expense of each targeted detector generated in accordance with the techniques provided herein (additional samples increase the accuracy of the statistical measures of the features of background traffic, while the size remains fixed based on the number of features determined).

At step 204, a particular type of network threat, such as a particular type of malware, is sampled and analyzed to determine features of the network threat. As mentioned above, the techniques provided herein only need a single or small number of positive samples of a particular threat, such as a sample of a particular strain of malware. In fact, in some embodiments, the smallest possible sample (e.g., a single sample) is utilized in order to increase computational efficiency and deploy a targeted detector as quickly as possible (e.g. without waiting for additional samples of the network threat to be located and/or become available). The features of the network threat may be determined in a similar manner to how the features of the background traffic are determined or in any other manner.

At step 206, the features of the sample of the network threat are compared to the features of the background traffic to determine a characteristic or direction that best differentiates the network threat from the background traffic. As is discussed in further detail below in connection with FIG. 4, this comparison may only involve a single threshold and, thus, can be performed extremely quickly and efficiently (especially when the computationally expensive analysis of the background traffic is precomputed offline). In some embodiments, this comparison involves comparing a representative vector of the sample of the network threat, as represented in d-dimension Euclidean space with a representative vector of the background traffic in this d-dimensional Euclidean space. Based on this comparison, a targeted detector for the particular network detector is created at step 208. The targeted detector is configured to recognize varying instances of threats that evade signature-matching and avoid false positives, as is described in further detail below in connection with FIG. 5. This detector is then deployed at step 210 to identify incoming network traffic (e.g., originating from the Internet and destined for an inner network, as shown in FIG. 1) associated with the particular type of network threat and apply an action to this traffic, such as blocking the network traffic from entering an inner network.

Generally, the process depicted in FIG. 2 mimics the human immune system, in that the human immune system generates unique antigens for newly encountered viruses, such as new strains of the flu, based on a sample of the new virus. Similarly, the techniques presented herein create detectors for newly encountered network threats so that an IDS/IPS can easily detect and remedy any other such threats. The targeted detectors are created quickly and efficiently using as few samples of a network threat as possible (e.g., a single sample) to provide flexibility and a quick response time. Each targeted detector is not expected to generalize well to other types (strains) of threats and, instead, should only be sensitive to threats of a particular type while returning as few false positives as possible. Consequently, the targeted detectors eliminate the need for security experts to tediously investigate similar malware strains over and over again (as these strains will be automatically detected and classified by a targeted detector).

Figure 3:
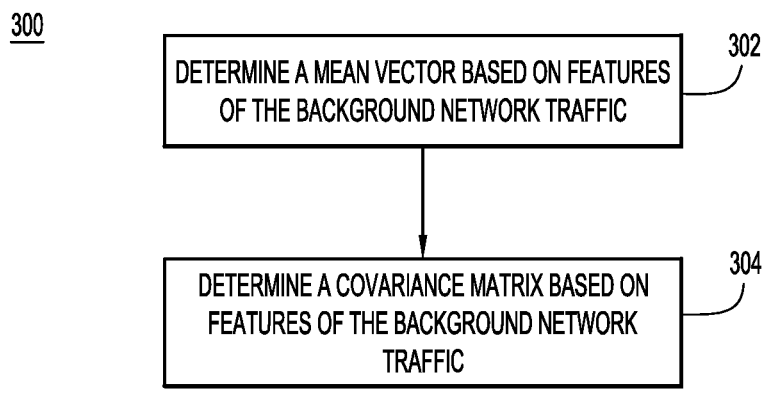
FIG. 3 is a flowchart illustrating a process for determining statistical measures based on features of background network traffic, according to an example embodiment.

Now referring to FIG. 3, a flowchart is described of a method 300 for determining statistical measures based on features of background traffic, such as the features determined in step 202 of FIG. 2. At step 302, the mean vector ($m_b$) of features of the background traffic is determined. At step 304, a covariance matrix ($C_b$) for features of the background network traffic is determined. The mean vector and the covariance matrix provide an indication of how normal network traffic should look, since it is assumed that the rate with which the malware is present in the normal traffic is small and its presence has negligible impact on the estimation of the mean and covariance. As mentioned above, in at least some embodiments, the method 300 for determining statistical measures that describe the features of the background network traffic can be performed once and used to create multiple targeted detectors. For example, the statistical measures determined in steps 302 and 304 (the mean vector and covariance matrix) can be used to determine unique differentiating characteristics (e.g., a direction) for multiple network threats, as is discussed in further detail below. Consequently, even though steps 302 and 304 may be computationally expensive, in at least some embodiments, these steps may only need to be performed once.

Figure 4:
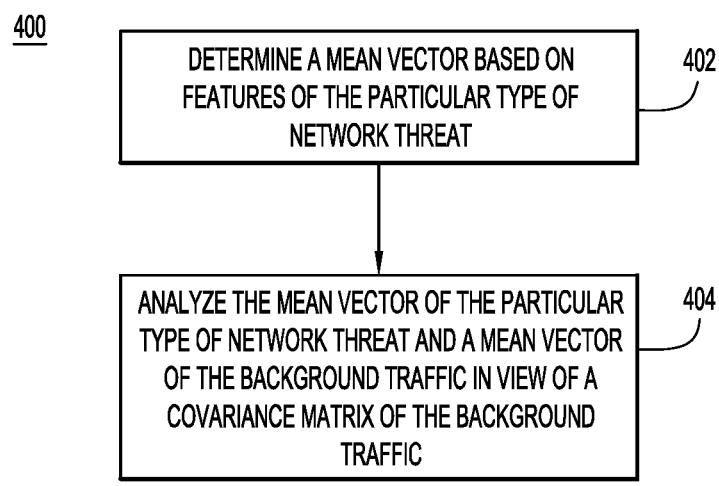
FIG. 4 is a flowchart illustrating a process for determining a direction or characteristic that best differentiates features of a network threat from features of background traffic, according to an example embodiment.

Now referring to FIG. 4, a flowchart is described of a method 400 for determining a characteristic or direction of a network threat that best differentiates the features of the network threat from the features of the observed traffic (e.g., as performed in step 206). Initially, at step 402, a mean vector ($m_m$) is determined for the network threat by analyzing the features of the network threat. Once the mean vector ($m_m$) is determined, the mean vector ($m_m$) can be compared to the mean vector ($m_b$) and covariance matrix ($C_b$) of the background traffic, to determine a direction (w) which bests separates the mean vector of the identified network threat sample(s) ($m_m$) from that of normal behavior. Generally, this may be determined with an iterative optimization of parameters to achieve a separation of the background samples and the network threat sample. More specifically, the direction (w) may be calculated using the following formula: $w = C_b^{-1}(m_m - m_b)$. Although the formula resembles the standard Fisher Linear Discriminant (FLD) formula, the formula only utilizes a covariance matrix on background data while the FLD formula also uses a covariance matrix of network threat samples. Eliminating the covariance matrix of network threat samples increases the efficiency of the formula while also allowing the direction to be determined with a minimal number of samples of the network threat (e.g., a single sample of malware). By comparison, the FLD requires thousands, if not millions, of network threat samples to create the second matrix. Since the directional formula utilized herein can be computed without collecting thousands or millions of samples of a network threat, a targeted detector for a particular type of network threat (e.g., a specific kind of malware or other such network threat) can be generated and deployed extremely quickly, such as within a few minutes after a network threat has been discovered.

Figure 5:
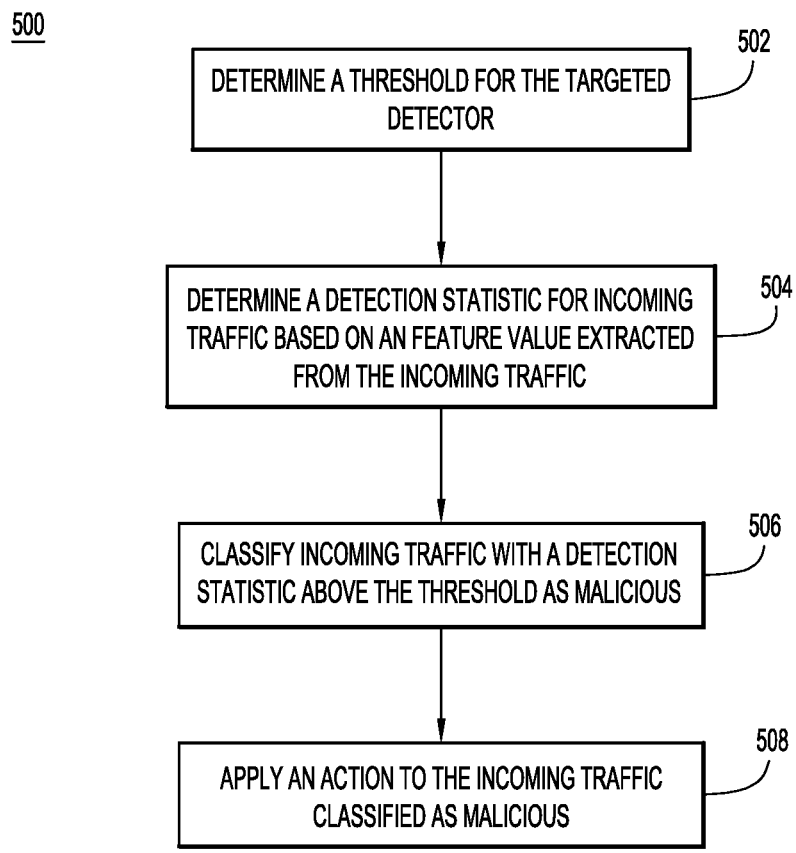
FIG. 5 is a flowchart illustrating a method for creating and deploying a targeted detector, according to an example embodiment.
Figure 6:
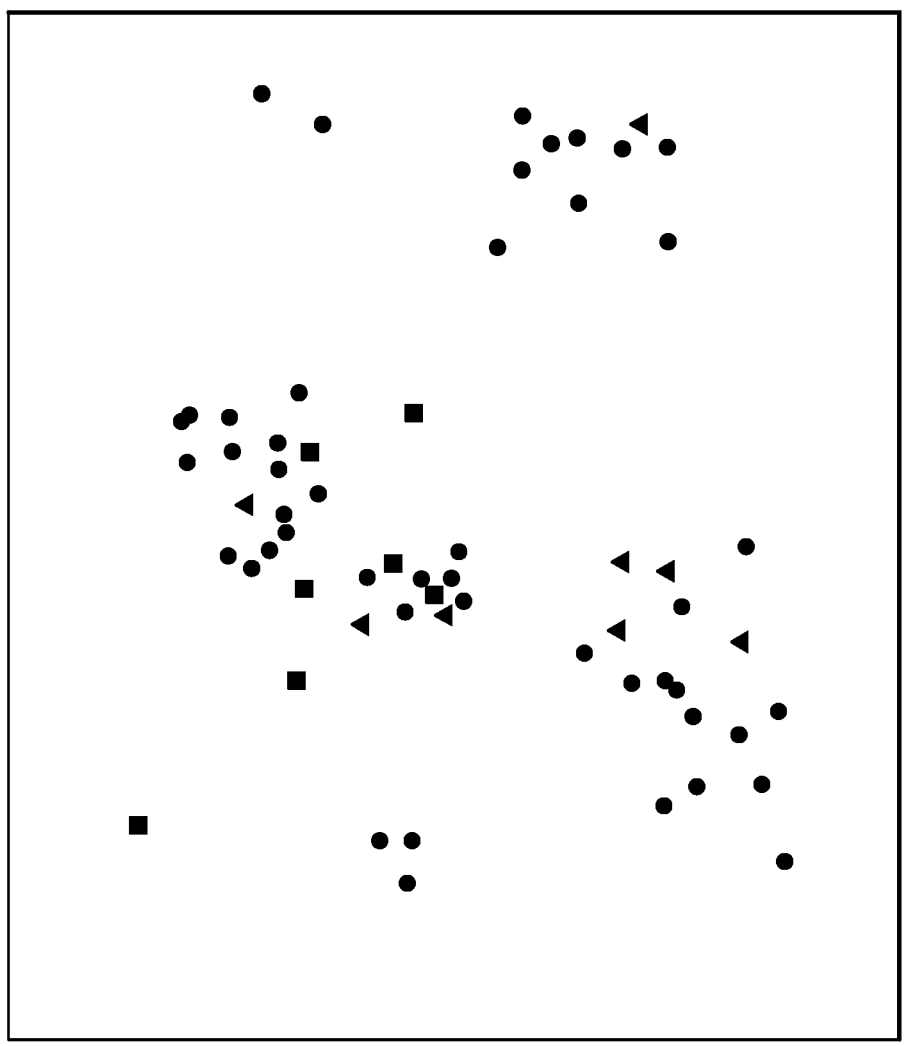
FIGS. 6-9 are diagrams graphically depicting data associated with a process for identifying malware with a targeted detector, according to an example embodiment.
Figure 7:
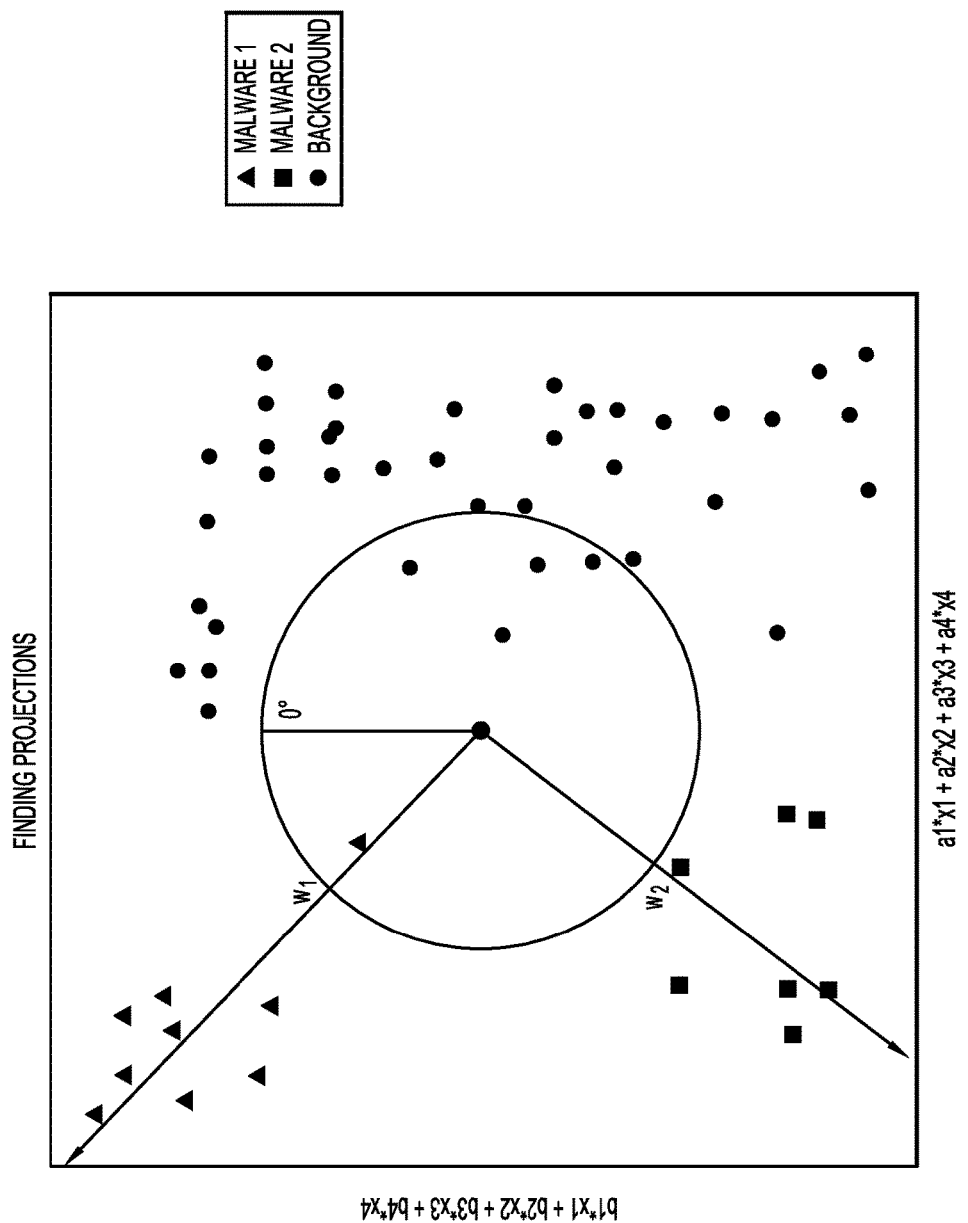

Referring to FIG. 5, a flowchart is now described of a method 500 for generating and deploying a targeted detector in order to identify and apply an action to a particular type of network threat (e.g., as performed in steps 208 and 210). Initially, at step 502, a threshold (T) is determined for the targeted detector. Generally, this threshold reduces the number of false positives while still allowing the targeted detector to detect slight variations, mutations, permutations, etc. of the network threat. In other words, a targeted detector should recognize varying instances of the sampled threat that evade signature-matching, but also minimize false positives. In order to do this, the threshold is set to a value that captures minimum detection statistics of the samples used to create the direction w. Then, in order to evaluate incoming traffic in view of the threshold, a detection statistic is determined based on a feature vector (X) extracted from the incoming traffic at step 504. For example, the detection statistic may be determined using the formula: $x^T w$. This formula projects the sample to the direction to compare the sample to the direction and, in essence, determine the detection statistic, which is essentially an anomaly score. This detection statistic is then compared against the threshold and, at step 506, any network traffic with a detection statistic exceeding the threshold will be classified as malicious. The feature value can be extracted very quickly and, thus, incoming traffic can be quickly evaluated by the targeted detector. When malicious traffic is identified, appropriate action may be taken at step 506. For example, the traffic may be blocked, associated IP information (e.g., a host or originating IP address) may be added to a black list, or any other such action that may prevent the malicious traffic from impacting an inner network, such as an enterprise network.

Customizing the direction/characteristic and threshold for each detector may enable each targeted detector to better identify variations of a network threat. For example, botnet and banking Trojans (e.g., Vawtrak) may use several mechanisms to disguise themselves as a normal process and avoid detection (e.g., the URL can shift from: hxxp://hybridtrend.com/Work/new/index.php to hxxp://mgsmedia.ru/Work/new/index.php to hxxp://heapeih.net/rss/feed/stream) and, thus, expression matching may not be able to track the Trojan (since many of the tokens, such as 'work,' 'new,' and 'index.php' are widely used for legitimate purposes). Instead, the behavior of the Trojan needs to be tracked and, thus, the targeted detector may be built accordingly. By comparison, click-fraud and malware distribution botnets (e.g., Bedep) may avoid detection by quickly rotating domains. Consequently, any kind of blacklisting mechanisms are almost useless. However, typically all of the rotating domains have one thing in common: the rotating domains can not be matched by a URL-based signature. For example, if a click-fraud and malware distribution botnet rotates through xqvyvibixozap.com/album.php, wtcwwvrrb-sut.com/forum.php, and uxazculxjoi1p.com/index.php, these domains cannot be matched by a URL-based signature because most web pages on the Internet have an initial page called index.php. Consequently, this can be identified as the characteristic or direction for this particular detector and the threshold can be set accordingly.

Now turning to FIGS. 6-9, for a description of an example use case of the techniques provided herein. FIGS. 6-9 utilize a two dimensional space; however, this is merely an example used for simplicity, and in operation, higher dimensional spaces may be utilized to ensure accuracy and efficiency. Initially, graph 600 depicts samples from two different samples of malware (malware 1 and malware 2) together with background samples. Malware 1 is shown as triangles, malware 2 is shown as squares, and the background traffic is shown as circles. Based on the background samples, the covariance matrix and mean vector of the background traffic may be computed. Then, the mean vector of each malware strain can be computed and compared to the mean vector and the covariance matrix of the background traffic. Graph 700 (FIG. 7) illustrates how the features of the projection for each malware strain may be plotted to determine a characteristic or direction that best differentiates each malware sample from the background traffic. Direction w1 indicates the direction or characteristic that best differentiates malware 1 from the background traffic while direction w2 indicates the direction or characteristic that best differentiates malware 2 from the background traffic.

Figure 8:
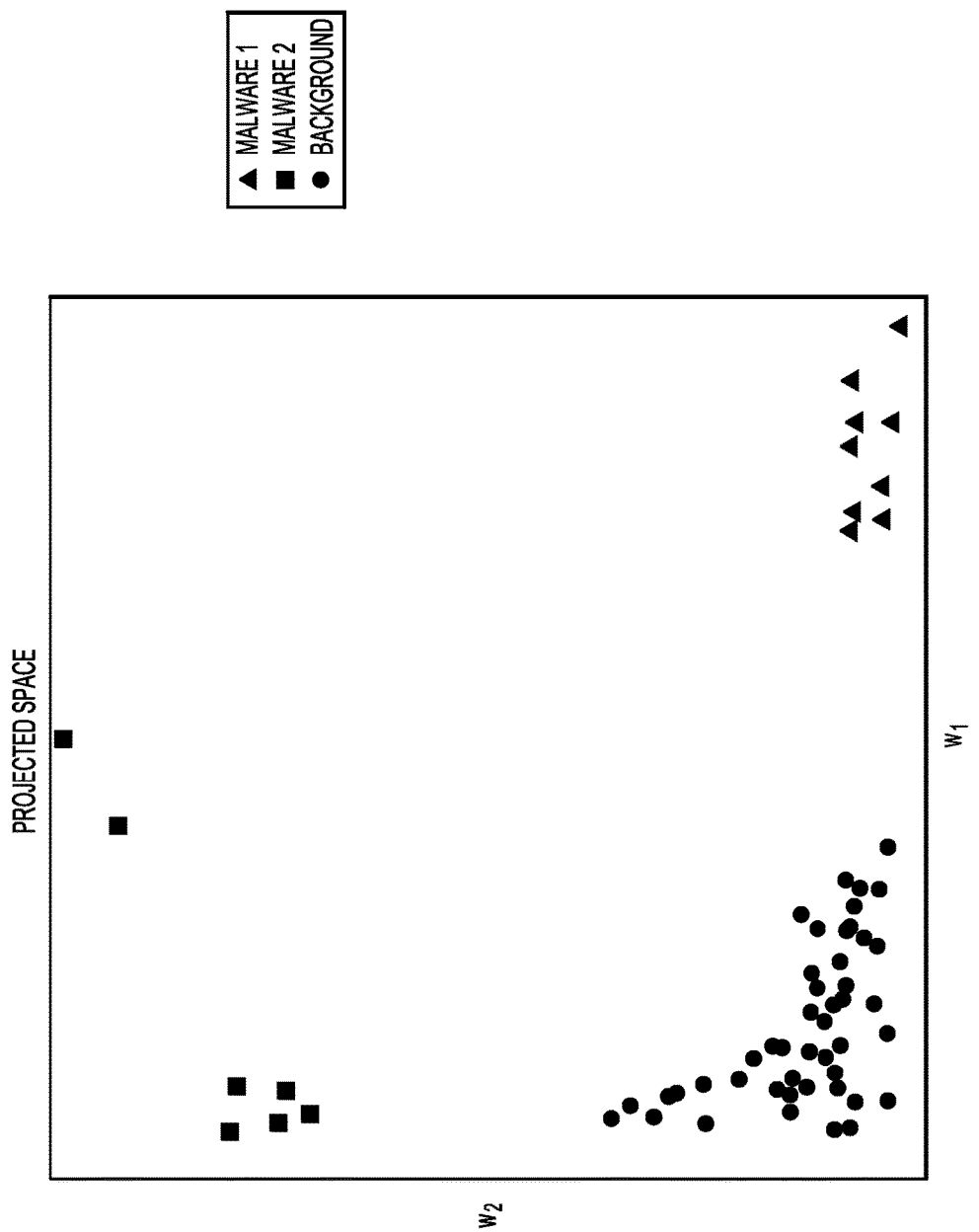
Figure 9:
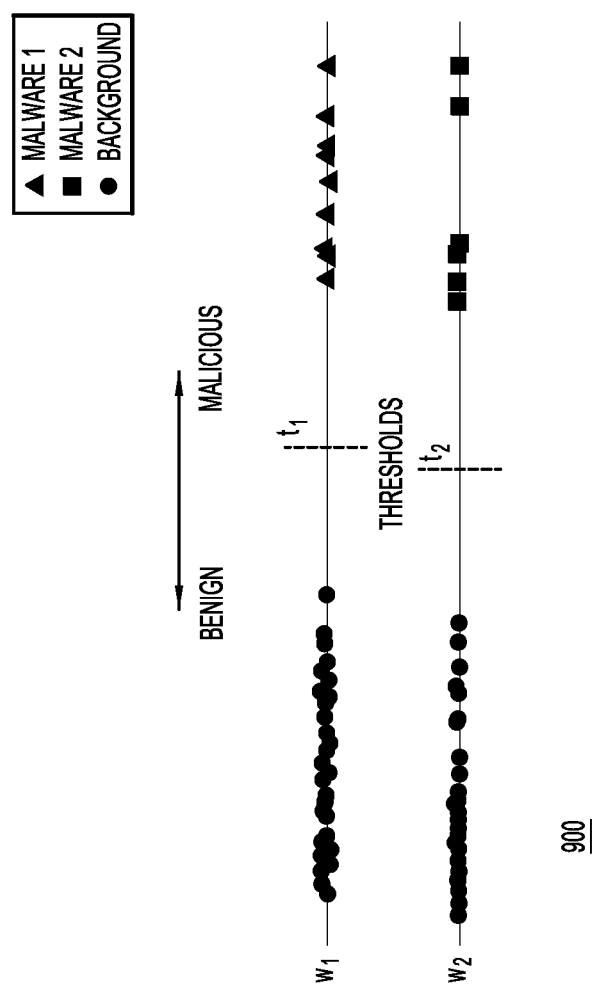

Once the directions (w1 and w2) have been determined, the samples can be projected against the directions, as shown in graph 800 (FIG. 8). Then, the projections can be utilized to determine a threshold (t1 for malware 1 and t2 for malware 2) for each strain of malware, as shown in diagram 900 (FIG. 9). Notably, in this example, the precomputed resources related to the background traffic (e.g., the covariance matrix and the background mean vector) are calculated once, but utilized for two samples of malware. In other words, a first mean vector and a second mean can each be compared to the same features of background traffic to determine distinct directions or characteristics (e.g., a first direction and a second direction) for two distinct network threats. Then, unique targeted detectors, created based on unique directions or characteristics, with unique thresholds, can be created (and deployed) for each unique network threat (e.g., each strain of malware).

Figure 10:
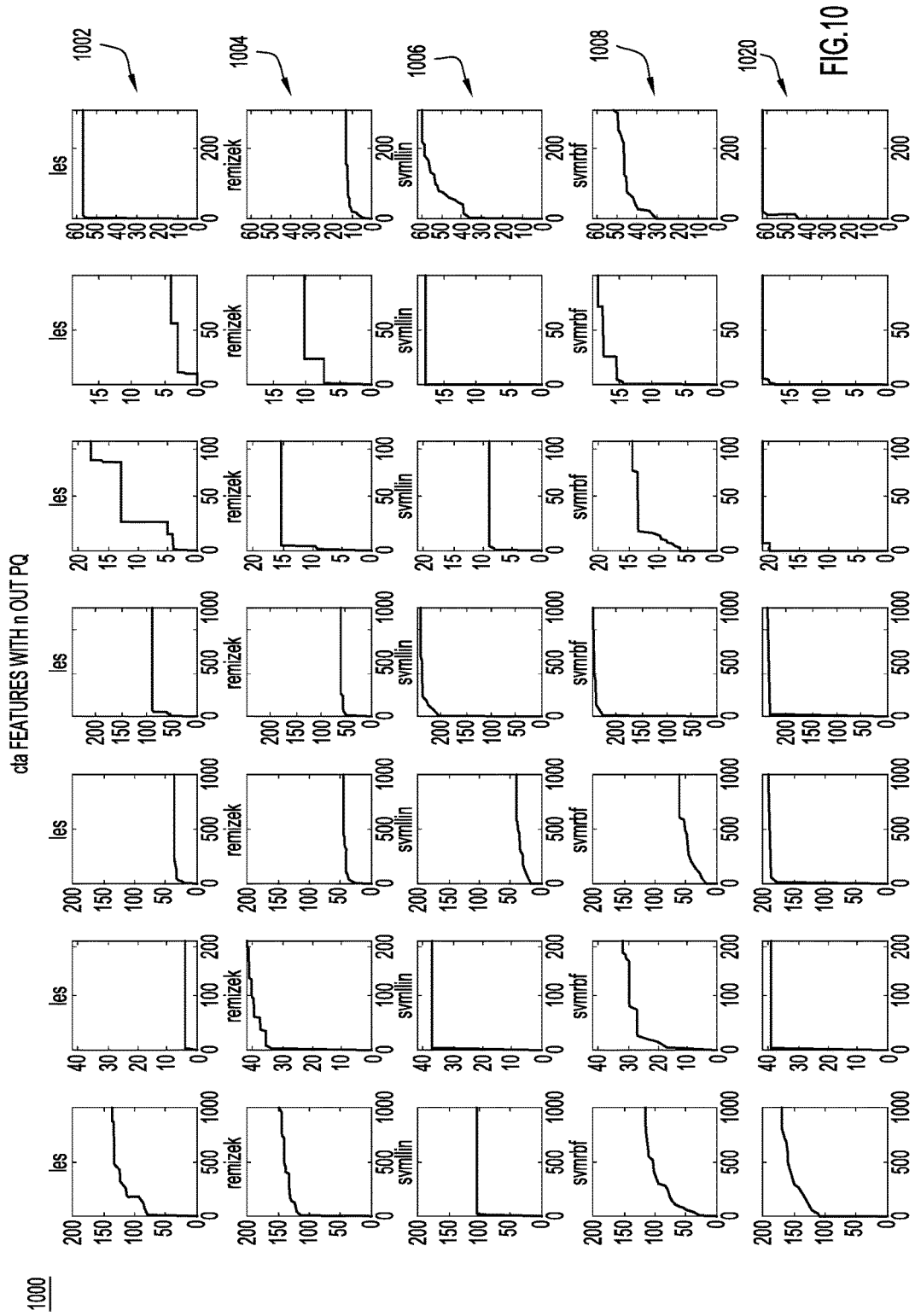
FIG. 10 is a diagram depicting graphs that illustrate the true and false positives for identifying a particular network threat with varying techniques, including a technique for detecting a network threat in accordance with an example embodiment.

Now referring to FIG. 10 for a description of diagram 1000 that depicts how the techniques provided herein may compare to existing techniques. Each row in diagram 1000 depicts a different technique when attempting to detect malicious domains from a dataset of approximately 37 thousand unique benign domains and 750 malicious domains (e.g., only 1-2% of the traffic is malicious, similar to observations of the Internet at large). Prior to performing the detection only a few samples of the malware associated with the responsible for the malicious domains were available for sampling (e.g., 35 families obtained through sandboxing). Row 1002 illustrates a deep random forest (called les) and row 1004 illustrates a shallow random forest (called remizek), since random forests are one of the most popular and widely used multi-class classifiers. Meanwhile, row 1006 illustrates support vector machine learning with linear kernels (svmlin), row 1008 illustrates support vector machine learning with radial basis function kernels (svmrbf), and row 1020 illustrates the techniques provided herein.

In each graph, a receiver operating characteristic (ROC) curve depicts absolute numbers of true positives on the y axis and false positives on the x axis. Consequently, ROC curves along the top of each graph indicate better performance. Notably, the techniques described herein outperform each of the other techniques and, thus, it is evident that at least in scenarios where only a few positive samples of network threats are available, generating and deploying targeted detectors in accordance with the techniques provided herein is not only efficient, but beneficial and safe, even compared to other popular detection techniques.

Figure 11:
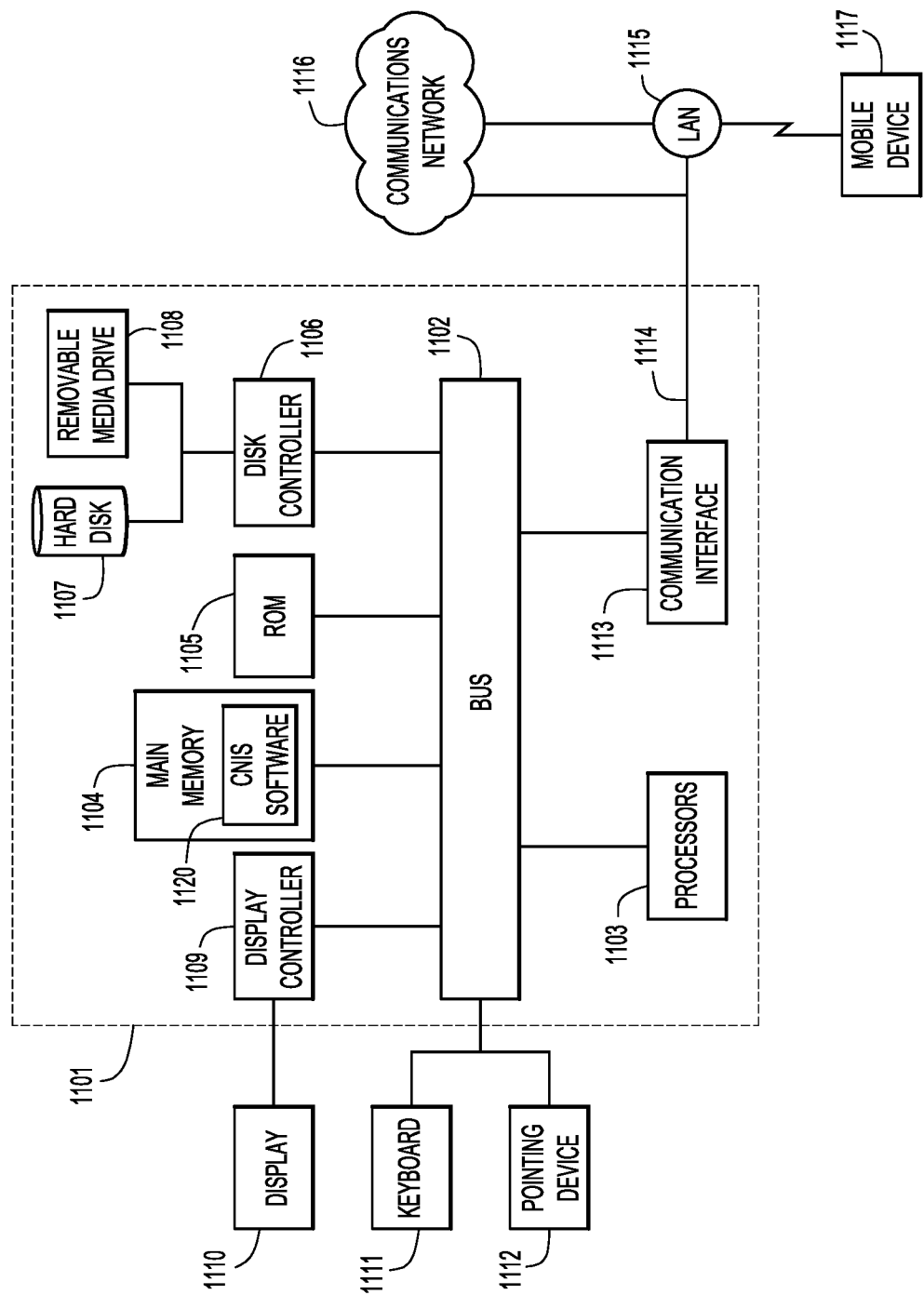
FIG. 11 is a simplified block diagram of a computing device that can be used to implement various embodiments of the disclosed technology, according to an example embodiment.

FIG. 11 illustrates an example hardware diagram of a computing apparatus 1101, such as a server or IPS represented by computing device 120 in FIG. 1, on which the techniques provided herein may be implemented. The apparatus 1101 includes a bus 1102 or other communication mechanism for communicating information, and processor(s) 1103 coupled with the bus 1102 for processing the information. While the figure shows a signal block 1103 for a processor, it should be understood that the processors 1103 represent a plurality of processing cores, each of which can perform separate processing. The apparatus 1101 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors, may individually or collectively, act as processing circuitry. The processing circuitry may be located in one device or distributed across multiple devices.

The apparatus 1101 also includes a main memory 1104, such as a random access memory (RAM) or other dynamic storage device (e.g., dynamic RAM (DRAM), static RAM (SRAM), and synchronous DRAM (SD RAM)), coupled to the bus 1102 for storing information and instructions to be executed by processor(s) 1103. The memory 1104 stores CNIS software 1120 that, when executed by the processor(s) 1103, enables the computing apparatus 1101 to perform the operations described herein. In addition, the main memory 1104 may be used for storing temporary variables or other intermediate information during the execution of instructions by the processor 1103. The apparatus 1101 further includes a read only memory (ROM) 1105 or other static storage device (e.g., programmable ROM (PROM), erasable PROM (EPROM), and electrically erasable PROM (EEPROM)) coupled to the bus 1102 for storing static information and instructions for the processor 1103.

The apparatus 1101 also includes a disk controller 1106 coupled to the bus 1102 to control one or more storage devices for storing information and instructions, such as a magnetic hard disk 1107, and a removable media drive 1108 (e.g., floppy disk drive, read-only compact disc drive, read/write compact disc drive, compact disc jukebox, tape drive, and removable magneto-optical drive). The storage devices may be added to the apparatus 1101 using an appropriate device interface (e.g., small computer system interface (SCSI), integrated device electronics (IDE), enhanced-IDE (E-IDE), direct memory access (DMA), or ultra-DMA). Thus, in general, the memory may comprise one or more tangible (non-transitory) computer readable storage media (e.g., a memory device) encoded with software comprising computer executable instructions and when the software is executed (by the processor) it is operable to perform the operations described herein.

The apparatus 1101 may also include a display controller 109 coupled to the bus 1102 to control a display 1110, such as a cathode ray tube (CRT), for displaying information to a computer user. The computer system 1101 may also include input devices, such as a keyboard 1111 and a pointing device 1112, for interacting with a computer user and providing information to the processor 1103. The pointing device 1112, for example, may be a mouse, a trackball, or a pointing stick for communicating directional information and command selections to the processor 1103 and for controlling cursor movement on the display 1110. In addition, a printer may provide printed listings of data stored and/or generated by the apparatus 1101.

The apparatus 1101 performs a portion or all of the processing steps described herein in response to the processor 1103 executing one or more sequences of one or more instructions contained in a memory, such as the main memory 1104. Such instructions may be read into the main memory 1104 from another computer readable medium, such as a hard disk 1107 or a removable media drive 1108. One or more processors in a multi-processing arrangement may also be employed to execute the sequences of instructions contained in main memory 1104. In alternative embodiments, hard-wired circuitry may be used in place of or in combination with software instructions. Thus, embodiments are not limited to any specific combination of hardware circuitry and software.

As stated above, the apparatus 1101 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the apparatus 1101, for driving a device or devices for implementing the processing techniques presented herein, and for enabling the apparatus 1101 to interact with a human user (e.g., network engineers). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The apparatus 1101 also includes a communication interface 1113 coupled to the bus 1102. The communication interface 1113 provides a two-way data communication coupling to a network link 1114 that is connected to, for example, a local area network (LAN) 1115, or to another communications network 1116 such as the Internet. For example, the communication interface 1113 may be a wired or wireless network interface card to attach to any packet switched (wired or wireless) LAN. As another example, the communication interface 1113 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1113 sends and receives electrical, electromagnetic or optical signals that carry digital data streams representing various types of information.

The network link 1114 typically provides data communication through one or more networks to other data devices. For example, the network link 1114 may provide a connection to another computer through a local are network 1115 (e.g., a LAN) or through equipment operated by a service provider, which provides communication services through a communications network 1116. The local network 1114 and the communications network 1116 use, for example, electrical, electromagnetic, or optical signals that carry digital data streams, and the associated physical layer (e.g., CAT 5 cable, coaxial cable, optical fiber, etc.). The signals through the various networks and the signals on the network link 1114 and through the communication interface 1113, which carry the digital data to and from the apparatus 1101 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The apparatus 1101 can transmit and receive data, including program code, through the network(s) 1115 and 1116, the network link 1114 and the communication interface 1113. Moreover, the network link 1214 may provide a connection through a LAN 1115 to a mobile device 1117 such as a personal digital assistant (PDA) laptop computer, or cellular telephone.

The techniques presented herein provide a number of advantages. As one example, the techniques provided herein allow accurate and quick deployment of targeted threat detectors that can react to known threats when only a single or small number of samples of the known threat are available. Consequently, there is no need to wait for tedious upgrades or further samples of the threat to be discovered. For example, administrators can quickly react to newly emerged threats or unwanted behaviors by submitting a sample so that a targeted detector is generated and deployed. The targeted detectors also close a vulnerability gap in most systems by deploying in the time it takes to implement upgrades to an IPS/IDS after discovery of a new threat. Moreover, since the targeted detectors are created based on data driven techniques, hand tuning and/or human interaction is not needed, thereby reducing security costs (as well as the time to implement a solution). The targeted detectors do not require retraining or upgrading and often only require a small number of computationally expensive operations (determining the features of the background traffic), even to generate and deploy multiple targeted detectors. Instead, each targeted detector is configured to detect variations and deployed once, with additional targeted detectors being deployed for new threats.

To summarize, in one form, a method is provided comprising: at a computing device having connectivity to a network, determining features of background network traffic; extracting features from a particular type of network threat; determining a characteristic of the particular type of network threat that best differentiates the features of the particular type of network threat from the features of the background network traffic; creating a targeted detector for the particular type of network threat based on the characteristic; and applying an action to particular incoming network traffic identified by the targeted detector as being associated with the particular type of network threat.

In another form, an apparatus is provided comprising: one or more network interface units configured to enable network connectivity; and a processor configured to: determine features of background network traffic; extract features from a particular type of network threat; determine a characteristic of the particular type of network threat that best differentiates the features of the particular type of network threat from the features of the background network traffic; create a targeted detector for the particular type of network threat based on the characteristic; and apply an action to particular incoming network traffic identified by the targeted detector as being associated with the particular type of network threat.

In yet another form, a non-transitory computer-readable storage media encoded with software comprising computer executable instructions is provided and when the software is executed operable to: determine features of background network traffic; extract features from a particular type of network threat; determine a characteristic of the particular type of network threat that best differentiates the features of the particular type of network threat from the features of the background network traffic; create a targeted detector for the particular type of network threat based on the characteristic; and apply an action to particular incoming network traffic identified by the targeted detector as being associated with the particular type of network threat.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at a computing device having connectivity to a network, determining features of background network traffic;
    extracting features from samples of a particular type of network threat;
    determining a characteristic of the particular type of network threat that best differentiates the features of the particular type of network threat from the features of the background network traffic;
    based on the characteristic, creating a targeted detector for the particular type of network threat that is deployable as a stand-alone detector; and
    applying an action to particular incoming network traffic identified by the targeted detector as being associated with the particular type of network threat.

2. The method of claim 1, further comprising:
    determining a mean vector for the background network traffic based on the features of the background network traffic;
    determining a covariance matrix for the background network traffic based on the features of the background network traffic; and
    determining a mean vector for the particular type of network threat based on the features of the particular type of network threat.

3. The method of claim 2, wherein the characteristic is based on a linear combination of a subset or all of the features of the background traffic and the features of the particular type of network threat, and determining the characteristic further comprises:
    analyzing the mean vector of the particular type of network threat and the mean vector of the background traffic in view of the covariance matrix.

4. The method of claim 2, wherein the mean vector of the particular type of network threat is the only statistical measure determined based on the features of the particular type of network threat.

5. The method of claim 1, wherein the creating the targeted detector further comprises:
    determining a detection statistic based on the characteristic, wherein the targeted detector evaluates the detection statistic of incoming network traffic based on a threshold that is set to a value that captures minimum values of the detection statistic from the samples of the particular type of network threat and identifies the particular incoming traffic as being associated with the particular type of network threat when the detection statistic of the particular incoming traffic exceeds the threshold.

6. The method of claim 1, wherein the particular type of network threat is a particular type of malware and applying the action further comprises:
    blocking traffic associated with the particular type of malware.

7. The method of claim 5, wherein the particular type of threat is a first particular type of malware, the features of the particular type of network threat are a first set of features of the first particular type of malware, the targeted detector is a first targeted detector, the characteristic is a first characteristic, the detection statistic is a first detection statistic, the threshold is a first threshold, the action is a first action, and the method further comprises:
- extracting a second set of features from samples of a second particular type of malware;
- determining a second characteristic of the second particular type of malware that differentiates the second set of features from the features of the background network traffic;
- determining a second detection statistic based on the second characteristic;
- based on the second characteristic, creating a second targeted detector for the second particular type of malware that is deployable as a stand-alone detector and that evaluates the second detection statistic of incoming network traffic based on a second threshold, wherein the second threshold is set to a value that captures minimum values of the second detection statistic from the samples of the second particular type of malware; and
- applying a second action to particular incoming network traffic identified by the second targeted detector as being associated with the second particular type of malware.

8. An apparatus comprising:
- one or more network interface units that enable network connectivity; and
- a processor that:
  - determines features of background network traffic;
  - extracts features from samples of a particular type of network threat;
  - determines a characteristic of the particular type of network threat that best differentiates the features of the particular type of network threat from the features of the background network traffic;
  - creates, based on the characteristic, a targeted detector for the particular type of network threat that is deployable as a stand-alone detector; and
  - applies an action to particular incoming network traffic identified by the targeted detector as being associated with the particular type of network threat.

9. The apparatus of claim 8, wherein the processor further:
- determines a mean vector for the background network traffic based on the features of the background network traffic;
- determines a covariance matrix for the background network traffic based on the features of the background network traffic; and
- determines a mean vector for the particular type of network threat based on the features of the particular type of network threat.

10. The apparatus of claim 9, wherein the characteristic is based on a linear combination of a subset or all of the features of the background traffic and the features of the particular type of network threat, and in determining the characteristic, the processor further:
- analyzes the mean vector of the particular type of network threat and the mean vector of the background traffic in view of the covariance matrix.

11. The apparatus of claim 9, wherein the mean vector of the particular type of network threat is the only statistical measure determined based on the features of particular type of network threat.

12. The apparatus of claim 8, wherein, in creating the targeted detector, the processor further:
- determines a detection statistic based on the characteristic, wherein the targeted detector evaluates the detection statistic of incoming network traffic based on a threshold that is set to a value that captures minimum values of the detection statistic from the samples of the particular type of network threat and identifies the particular incoming traffic as being associated with the particular type of network threat when the detection statistic of the particular incoming traffic exceeds the threshold.

13. The apparatus of claim 8, wherein the particular type of network threat is a particular type of malware and, in applying the action, the processor further:
- blocks traffic associated with the particular type of network threat.

14. The apparatus of claim 12, wherein the particular type of threat is a first particular type of malware, the features of the particular type of network threat are a first set of features of the first particular type of malware, the targeted detector is a first targeted detector, the characteristic is a first characteristic, the detection statistic is a first detection statistic, the threshold is a first threshold, the action is a first action, and the processor further:
- extracts a second set of features from samples of a second particular type of malware;
- determines a second characteristic of the second particular type of malware that differentiates the second set of features from the features of the background network traffic;
- determines a second detection statistic based on the second characteristic;
- creates, based on the second characteristic, a second targeted detector for the second particular type of malware that is deployable as a stand-alone detector and that evaluates the second detection statistic of incoming network traffic based on a second threshold, wherein the second threshold is set to a value that captures minimum values of the second detection statistic from the samples of the second particular type of malware; and
- applies a second action to particular incoming network traffic identified by the second targeted detector as being associated with the second particular type of malware.

15. A non-transitory computer-readable storage media encoded with software comprising computer executable instructions and when the software is executed operable to:
- determine features of background network traffic;
- extract features from samples of a particular type of network threat;
- determine a characteristic of the particular type of network threat that best differentiates the features of the particular type of network threat from the features of the background network traffic;
- based on the characteristic, create a targeted detector for the particular type of network threat that is deployable as a stand-alone detector; and
- apply an action to particular incoming network traffic identified by the targeted detector as being associated with the particular type of network threat.

16. The non-transitory computer-readable storage media of claim 15, further comprising instructions operable to:
- determine a mean vector for the background network traffic; based on the features of the background network traffic;

determine a covariance matrix for the background network traffic based on the features of the background network traffic; and determine a mean vector for the particular type of network threat based on the features of the particular type of network threat.

17. The non-transitory computer-readable storage media of claim 16, wherein the characteristic is based on a linear combination of a subset or all of the features of the background traffic and the features of the particular type of network threat, and the instructions operable to determine the characteristic further comprise instructions operable to:

analyze the mean vector of the particular type of network threat and the mean vector of the background traffic in view of the covariance matrix.

18. The non-transitory computer-readable storage media of claim 16, wherein the mean vector of the particular type of network threat is the only statistical measure determined based on the features of the particular type of network threat.

19. The non-transitory computer-readable storage media of claim 15, further comprising instructions operable to:

determine a detection statistic based on the characteristic, wherein the targeted detector evaluates the detection statistic of incoming network traffic based on a threshold that is set to a value that captures minimum values of the detection statistic from the samples of the particular type of network threat and identifies the particular incoming traffic as being associated with the particular type of network threat when the detection statistic of the particular incoming traffic exceeds the threshold; and block traffic associated with the particular type of network threat.

20. The non-transitory computer-readable storage media of claim 15, wherein the particular type of threat is a first particular type of malware, the features of the particular type of network threat are a first set of features of the first particular type of malware, the targeted detector is a first targeted detector, the characteristic is a first characteristic, the detection statistic is a first detection statistic, the threshold is a first threshold, the action is a first action, and the instructions are further operable to:

extract a second set of features from samples of a second particular type of malware;

determine a second characteristic of the second particular type of malware that differentiates the second set of features from the features of the background network traffic;

determine a second detection statistic based on the second characteristic;

based on the second characteristic, create a second targeted detector for the second particular type of malware that is deployable as a stand-alone detector and that evaluates the second detection statistic of incoming network traffic based on a second threshold, wherein the second threshold is set to a value that captures minimum values of the second detection statistic from the samples of the second particular type of malware; and apply a second action to particular incoming network traffic identified by the second targeted detector as being associated with the second particular type of malware.

* * * * *